(12) United States Patent
Connelly

(10) Patent No.: US 8,464,945 B2
(45) Date of Patent: Jun. 18, 2013

(54) SHOPPING CART

(71) Applicant: Luke Sean Connelly, Newport (GB)

(72) Inventor: Sean Richard Connelly, Newport (GB)

(73) Assignee: Luke Sean Connelly, South Glamorgan (GB)

( * ) Notice: Subject to any disclaimer, the term of this patent is extended or adjusted under 35 U.S.C. 154(b) by 0 days.

(21) Appl. No.: 13/685,157

(22) Filed: Nov. 26, 2012

(65) Prior Publication Data
US 2013/0080719 A1 Mar. 28, 2013

Related U.S. Application Data

(62) Division of application No. 12/853,471, filed on Aug. 10, 2010.

(30) Foreign Application Priority Data

Aug. 11, 2009 (GB) .................... 0913990.8
Sep. 2, 2009 (GB) .................... 0915241.4
Sep. 9, 2009 (GB) .................... 0915740.5

(51) Int. Cl.
G06K 15/00 (2006.01)
(52) U.S. Cl.
USPC ............................ 235/383; 235/385; 235/375

(58) Field of Classification Search
USPC .......... 235/383, 375, 382, 382.5, 487; 705/44
See application file for complete search history.

(56) References Cited

U.S. PATENT DOCUMENTS

| 3,836,755 A | 9/1974 | Ehrat |
| 4,071,740 A | 1/1978 | Gogulski |
| 5,898,158 A | 4/1999 | Shimizu et al. |
| 6,910,697 B2 | 6/2005 | Varatharajah et al. |
| 7,364,070 B2 | 4/2008 | Chang |
| 7,395,902 B2 | 7/2008 | D'Arca et al. |
| 7,934,647 B1 | 5/2011 | Mims et al. |
| 7,953,606 B2 | 5/2011 | Shirasaki |
| 2004/0249717 A1 | 12/2004 | Shirasaki |
| 2008/0028146 A1 | 1/2008 | Dan et al. |
| 2008/0308630 A1 | 12/2008 | Bhogal et al. |
| 2009/0089496 A1 | 4/2009 | Huang |
| 2009/0106085 A1 | 4/2009 | Raimbeault |

FOREIGN PATENT DOCUMENTS

| EP | 0375248 A1 | 6/1990 |
| EP | 0999513 A2 | 5/2000 |
| ES | 2102311 A1 | 7/1997 |
| JP | 63121988 | 8/1988 |
| WO | WO 98/44462 | 10/1998 |
| WO | WO 00/73971 A1 | 12/2000 |
| WO | WO 02/01476 A2 | 1/2002 |

Primary Examiner — Edwyn Labaze
(74) Attorney, Agent, or Firm — Gordon & Jacobson, PC

(57) ABSTRACT

A shopping cart is disclosed. The shopping cart comprises a frame, a receptacle for holding items and a scanning apparatus for scanning items to be placed within the receptacle. The shopping cart further comprising weighing means for monitoring the weight of the receptacle.

10 Claims, 5 Drawing Sheets

SHOPPING CART

CROSS-REFERENCE TO RELATED APPLICATIONS

This application is a divisional of U.S. patent application Ser. No. 12/853,471, filed on Aug. 10, 2010, herein incorporated by reference in its entirety, which claims priority from Great Britain Application Nos. GB0915241.4, filed Sep. 2, 2009; GB0915740.5, filed on Sep. 9, 2009; and GB0913990.8, filed on Aug. 11, 2009.

BACKGROUND

1. Field

The present invention relates to a trolley, and particularly, but not exclusively to a supermarket shopping trolley (commonly known in the United States as a shopping cart).

2. State of the Art

When shopping at a supermarket, the items to be purchased are typically placed within a trolley and taken to a point of sale terminal where a cashier scans each item in turn to record the sale. The items must be removed from the trolley and presented to the cashier in turn so that each item can be recorded separately, and so that the total cost of all items purchased can be calculated. Once the sale has been recorded, the items must then be returned to the trolley for subsequent transport to a car, for example.

The above process requires a considerable time at the point of sale with the result that long queues of shoppers can often develop, which can be a problem, particularly for shoppers with young children and babies. In addition, it may be necessary to return one or more items if the shopper does not have enough money to pay for the items.

SUMMARY OF THE INVENTION

I have now devised a trolley which alleviates the above-mentioned problems.

In accordance with the present invention as seen from a first aspect, there is provided a trolley, the trolley comprising a frame, a receptacle for holding items and a scanning arrangement for scanning items to be placed within the receptacle, the trolley further comprising weighing means for monitoring the weight of the receptacle.

The trolley thus enables items to be scanned and recorded as items are placed within the receptacle, so that the user can keep track and monitor the running total cost, for example.

Preferably, the weighing means and scanning arrangement are communicatively coupled. The weighing means is preferably arranged to generate a signal in response to a monitored change in receptacle weight being above a threshold weight value. Preferably, the signal is communicated to the scanning arrangement.

The weighing means and scanning arrangement are preferably communicatively coupled through one or more electrical connections or via a wireless arrangement.

Preferably, the scanning arrangement comprises a first scanning beam for reading an item identification label, such as barcode, on the item to be placed into the receptacle and a second scanning beam for monitoring the position of a users' arm with respect to the receptacle. The second scanning beam preferably extends substantially over the receptacle and is preferably arranged to shroud at least a portion of an opening to the receptacle.

Preferably, the second scanning beam is positioned with respect to the first scanning beam, such that a users' arm must enter or otherwise break the second scanning beam to scan an item identification label with the first scanning beam.

The scanning arrangement preferably comprises memory means for recording the items placed within the receptacle and processing means for processing the items placed within the receptacle, to determine the total cost of items placed within the receptacle, the actual items placed within the receptacle and the weight of each item, for example. Preferably, the scanning arrangement further comprises a display for displaying information to the user, such as the total cost items, a list of items within the receptacle and instructions on how to operate the scanning arrangement, for example.

The scanning arrangement preferably monitors the time between scanning an item identification label of the item to be placed within the receptacle and the placing of the item within the receptacle, the latter being determined by monitoring for the signal from the weighing means.

Preferably, the scanning arrangement is arranged to request that the user re-scans the item identification label if the time period is above a threshold time.

Preferably, the scanning arrangement is also arranged to request that the user re-scans the item identification label if the users' arm moves out from the second scanning beam, once the item identification label has been scanned, before a signal generated by the weighing means is detected by the scanning arrangement.

Preferably, the scanning arrangement is further arranged to request that the user re-scans the item identification label if the second scanning beam is further entered or otherwise further broken, by the users' other arm for example, before a signal generated by the weighing means is detected by the scanning arrangement. When scanning a large item, a user may be required to use two hands to hold the item. Accordingly, it is a requirement that the second scanning beam is preferably broken in a continuous manner, as distinct from several breaks at isolated positions within the beam, at separated times.

The scanning arrangement is further arranged to request that the user re-scans the item if the weighing means generates a signal indicating that an item has been placed within the receptacle without the item identification label being scanned by the first scanning beam.

The scanning arrangement is further arranged to request that the user re-scans the item identification label if the signal generated by the weighing means indicates that the weight of the item is outside a permitted weight range as provided by the item identification label.

The time period and second scanning beam are intended to try and minimise any misuse of the scanning arrangement. For example, it is envisaged that a user may attempt to scan a relatively cheap item (to record a cheap purchase), but place a more expensive item within the receptacle. The second scanning beam overcomes this problem by monitoring the position of the users' arm and thus the item scanned to ensure that it is the item scanned that is placed within the receptacle. The processing means subsequently monitors for a signal (within a predefined time period) from the weighing means signifying an increase in the weight of the receptacle, before allowing a further item to be scanned. This time period is intended to try and minimise the scanning of multiple items before placing them in the trolley, so that the processor can record the weight and corresponding cost of each item.

Since the second scanning beam is also sensitive to the number of breaks (or otherwise entries) in the beam, then the scanning arrangement can also detect if a user scans a relatively cheap item with one hand (and thus breaks the second scanning beam at one position), but attempts to place a more expensive item in the receptacle (and thus break the second scanning beam at a second position) with the other hand.

Furthermore, if a user breaks the second scanning beam holding a cheap item and a more expensive item in the same hand (and so breaks the second scanning beam in a continuous manner) and scans the cheap item but places the more expensive item in the receptacle, then the weight of the scanned (cheap) item, as provided by the barcode, will not correspond to the monitored weight increase (due to the expensive item) determined by the weighing means. In this case, the scanning arrangement will request that the user re-scans the correct item before allowing the user to proceed.

Preferably, the scanning arrangement is supported on the trolley by a support arrangement. Preferably, the scanning arrangement is detachably coupled to the support arrangement and is arranged to couple with a point of sale terminal so that items recorded in the memory means can be downloaded to the point of sale terminal.

The support arrangement is preferably reconfigurable between a storage configuration in which the support arrangement is positioned adjacent the frame and an operative configuration in which the support arrangement extends from the frame, substantially over the receptacle.

Preferably, the receptacle is hingedly coupled to the frame by coupling means.

Preferably, an underside of the receptacle is arranged to engage with a stop on the frame. Preferably, the stop is hingedly coupled to the frame.

In a first embodiment, the length of the stop is preferably adjustable to enable the receptacle to be suitably leveled. In a second embodiment, the stop is preferably hingedly coupled at a first end to the underside of the receptacle and arranged to pivot about a fulcrum such that a second end of the stop engages with the weighing means.

Preferably, the weighing means comprises shock absorbing means for absorbing impacts of items that are dropped within the receptacle.

The weighing means preferably comprises a load cell.

Preferably, the trolley comprises a handle and a plurality of wheels arranged upon the frame.

In accordance with the present invention, as seen from a second aspect, there is provided a scanning arrangement for scanning items to be placed within a receptacle of a trolley, the arrangement comprising a first scanning beam for scanning an item identification label on the item and a second scanning beam which is arranged to shroud at least a portion of an opening to the receptacle and which is arranged to substantially encompass the first scanning beam, such that,
the user must first enter or otherwise break the second scanning beam in order to scan the identification label of the item using the first scanning beam.

The preferred features of the scanning arrangement of the second aspect may comprise one or more of the features associated with the scanning arrangement incorporated in the trolley of the first aspect.

In accordance with the present invention as seen from a third aspect, there is provided a data storage device comprising memory means, a controller for controlling the transfer of data to and from the memory means, and a first and second connector which are configured to provide a connection with a user interface device,
wherein a user is permitted to read and write data to and from the memory means using the interface device when the storage device is connected thereto using the first connector, and wherein, a user is only permitted to read and write data from the memory means using the interface device when the storage device is connected thereto using the second connector, Preferably, the storage device further comprises a serial code associated therewith, which is matched to an access code that must be determined before a user can write data to the memory means.

The access code is preferably only determinable when the storage device is connected to the user interface device using the first connector.

Preferably, the memory means comprises a plurality of memory files which are individually selectable for reading and writing data to an from as required, by a sleeve which is arranged to rotate to select the desired file, The storage device preferably further comprises a window for admitting wireless signals to one of a plurality of receiver units. Preferably, the receiver units are individually presentable to the window using the sleeve. Preferably, the receiver units separately correspond with a memory file.

The receiver units are arranged to receive wireless signals via a scanner, for example, for reading and writing data to and from the selected memory file.

In accordance with the present invention as seen from a fourth aspect there is provided a shopping system, the system comprising:
at least one trolley according to the first aspect;
a docking station for holding and receiving a scanning arrangement of the trolley of first aspect; and,
at least one point of sale terminal for recording the sale of items recorded by the scanning arrangement.

Preferably, the docking station is arranged to recharge a power supply for the scanning arrangement.

Embodiments of the present invention will now be described by way of example only and with reference to the accompanying drawings.

DETAILED DESCRIPTION OF THE PREFERRED EMBODIMENTS

Figure 1A:
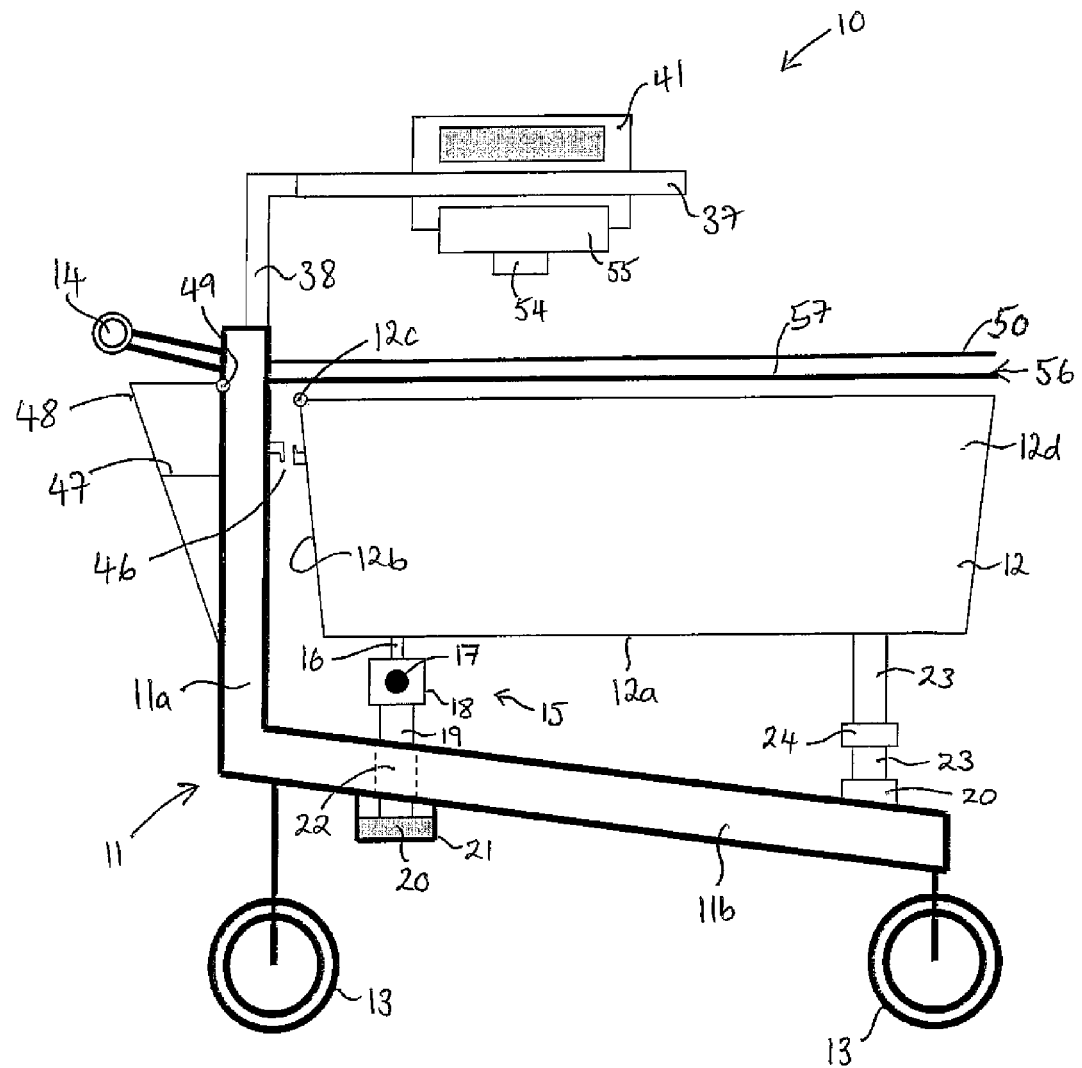
FIG. 1a is a side view of a trolley according to a first embodiment of the present invention.
Figure 1B:
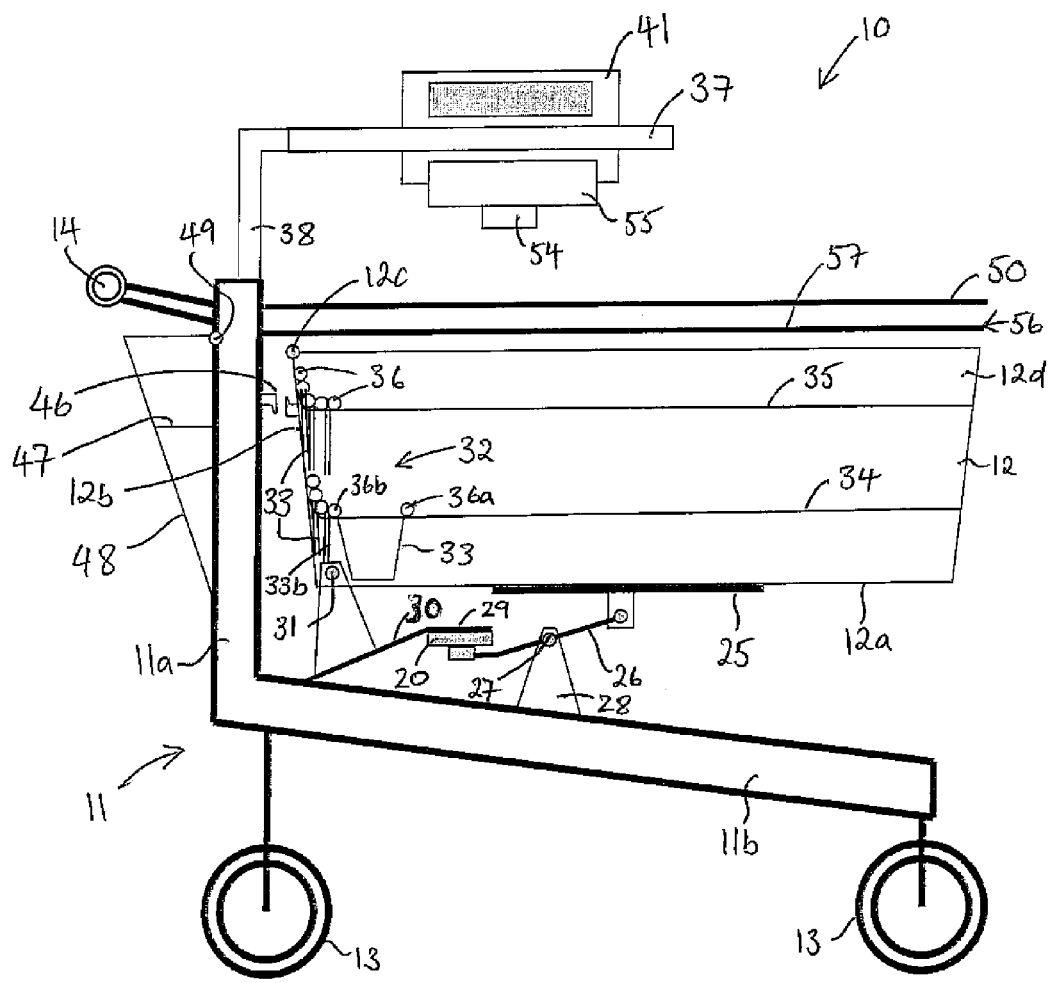
FIG. 1b is a side view of a trolley according to a second embodiment of the present invention.

Referring to FIGS. 1a and 1b of the drawings, there is illustrated a trolley 10 according to a first and second embodiment of the present invention, respectively. The trolley comprises a first and second substantially L-shaped frame section 11 (only one of which is illustrated in FIGS. 1a and 1b). Each frame section 11 comprises a substantially upright frame member 11a and a base member 11b, which extends from a lower region of the respective upright member 11a, substantially perpendicularly thereto. The trolley 10 further comprises a receptacle 12 or basket mounted upon the frame 11 for receiving and holding items, such as tinned food, packets of biscuits etc (not shown) and other items that are intended to be purchased by a shopper (not shown) as the shopper shops within a supermarket (not shown), for example. The trolley 10 further comprises a pair of wheels 13, such as castor wheels, disposed on the underside of each base frame member 11b, to enable the trolley 10 to be manoeuvred easily and a handle 14, which extends between frame members 11c, for gripping and steering the trolley 10.

According to a first embodiment of the present invention, as illustrated in FIG. 1a of the drawings, the receptacle 12 is mounted upon the base frame members 11b by a coupling arrangement 15 disposed proximate to the intersection of the upright and base frame members 11a, 11b, namely the rear of the trolley 10. The coupling arrangement comprises a first and second receptacle arm 16 (only one of which is illustrated in FIG. 1a) which extend from the underside of the receptacle 12 substantially adjacent the base member 11b of the first and second frame sections 11, respectively. The distal end of each arm 16 is rigidly mounted to a pivot rod 17 which extends across the width of the trolley 10 and which is arranged to extend through a first and second bearing housing 18 (again only one of which is illustrated in FIG. 1) disposed at the distal end of a first and second frame arm 19 (only one of which is illustrated in FIG. 1a), respectively.

The frame arms 19 are separately coupled at a proximal end thereof to a load cell 20 mounted within a frame 21, which is coupled to the underside respective base member 11b. The arms 19 extend from the respective load cell 20, through a passage 22 within respective base member 11b and terminate at the respective bearing housing 18. The passages 22 (only one of which is illustrated in FIG. 1a) comprises a collar or guide (not shown) which minimises any lateral movement of the arms 19 within the respective passage 22 and thus constrain the arms 19 to movement substantially along the respective passage 22. Each bearing housing 18 comprises a plurality of roller bearings (not shown) which enable the pivot rod 17 to rotate about a longitudinal axis thereof and therefore enable the receptacle 12 to pivot with respect to the frame sections 11.

The front of the receptacle 12 is held spaced from the front of each base frame member 11b by an adjustable arm 23 that is pivotable about a pivot point (not shown) disposed upon a cross member (not shown), which extends between base frame members 11b proximate the front of the trolley 10. The adjustable arm 23 is arranged to pivot between a first position in which it extends substantially parallel with the plane in which the base frame members 11b extend, but is biased to a second position in which the adjustable arm 23 extends substantially perpendicularly to the plane in which the base frame members 11b extend. A proximal end of the adjustable arm 23 is coupled to a load cell 20 while the distal end of the arm 23 is arranged to abut the underside of the receptacle 12 at the front thereof when the arm 23 is arranged in the second configuration.

The length of the adjustable arm 23 is varied using an adjustment device 24 disposed upon the arm 23, so that the base 12a of the receptacle 12 can be suitably leveled. This enables the weight of the receptacle 12 to become evenly distributed between the two receptacle arms 16 disposed at the rear of the receptacle 12 and the adjustable arm 23 at the front of the receptacle 12, and thus the load cells 20. The load cells 20 enable the weight of the receptacle 12 and thus any items (not shown) placed within the receptacle 12 to be determined and monitored.

In an alternative configuration the distal end of each receptacle arm 16 is coupled with a flexible arm, such as a rubber arm (not shown), for example. The rubber arms (not shown) extend from the load cell 20 through the respective base member 11b and couple with the respective frame arm 19. The flexible nature of the rubber arms (not shown) eliminate the requirement for a pivot rod 17 and bearing housings 18. However, to minimise any sliding of the receptacle 12 over the base frame members 11b, a pair of detents (not shown) are disposed upon each frame member 11b, with one detent of each pair being disposed in front of and behind each rubber arm (not shown) to limit any translational or sliding movement of the receptacle 12 over the base frame members 11b. In this embodiment, the adjustable arm 23 is substantially rigidly mounted to the cross member (not shown) and comprises a magnetic distal end (not shown) which is arranged to couple with an under side 12a of the receptacle 12 to further prevent any sliding of the receptacle 12 over the base frame members 11b.

According to a second embodiment of the present invention as illustrated in FIG. 1b of the drawings, the receptacle 12 comprises a plate 25 which is rigidly coupled to the underside of the base 12a of the receptacle 12 and which is centred substantially at the centre of the base 12a of the receptacle 12. The plate 25 is hingedly coupled at its centre to a proximal end of a pivot arm 26. The pivot arm 26 is rotatably coupled at a position intermediate opposite ends thereof to a first brace 27, which extends across the trolley 10 between a first brace support 28 mounted upon each frame member 11b. A distal end of the pivot arm 26 is arranged to impinge upon a load cell 20 or similar disposed at the underside of a second brace 29, which similarly extends across the trolley 10 between a brace support 30 mounted upon each frame member 11b.

The receptacle 12 is rotatably coupled to the second supports 30 via a hinge 31 disposed at a lower region of the receptacle 12 and at the rear thereof, such that the receptacle 12 is biased to rotate in a clockwise direction as viewed in FIG. 1b. Accordingly, the weight of the receptacle 12 acting upon the plate 25 acts upon the pivot arm 26 to cause the arm to rotate in a clockwise direction (as viewed in FIG. 1b), thereby causing the distal end of the arm 26 to compress the load cell 20 against the second brace 29. In this manner, the force acting upon the load cell 20 becomes representative of the weight of the receptacle 12 and any contents (not shown) within the receptacle 12.

The trolley 10 of the first and/or second embodiment may further comprise a baggage system 32 for supporting a plurality of bags 33 within the receptacle 12. The baggage system is illustrated in FIG. 1b of the drawings and comprises a first and second pair of rails 34, 35 (only one of which is illustrated in FIG. 1b), which extend along the length of the receptacle, with one rail of each pair being disposed either side of the receptacle 12. The rails 34, 35 extend substantially parallel to each other and the first pair of rails 34 are disposed at a vertical position which is below the second pair of rails 35. Each pair of rails 34, 35 is arranged to carry a plurality of roller supports 36 which separately extend between the rails 34, 35 associated with each pair and which are arranged to support the bags 33 or similar. The bags 33 are preferably provided in a stacked configuration at one end of the receptacle 12, such that upon pulling a first roller support 36a, for example, which extends between the rails 34 of the first pair, the first bag 36a is arranged to open. If the first roller support 36a is further pulled, then a second roller support 36b is arranged to move along the first pair of rails 34 to open a further bag 33b. In this manner, a series of open bags 33 can be presented to the shopper (not shown) within the receptacle 12, for organising the goods (not shown) therein. When all the bags 33 supported upon the first pair of rails 34 have been suitably filled, the bags 33 supported on the second pair of rails 35 may be opened, if required, to accommodate further goods (not shown).

Figure 2:
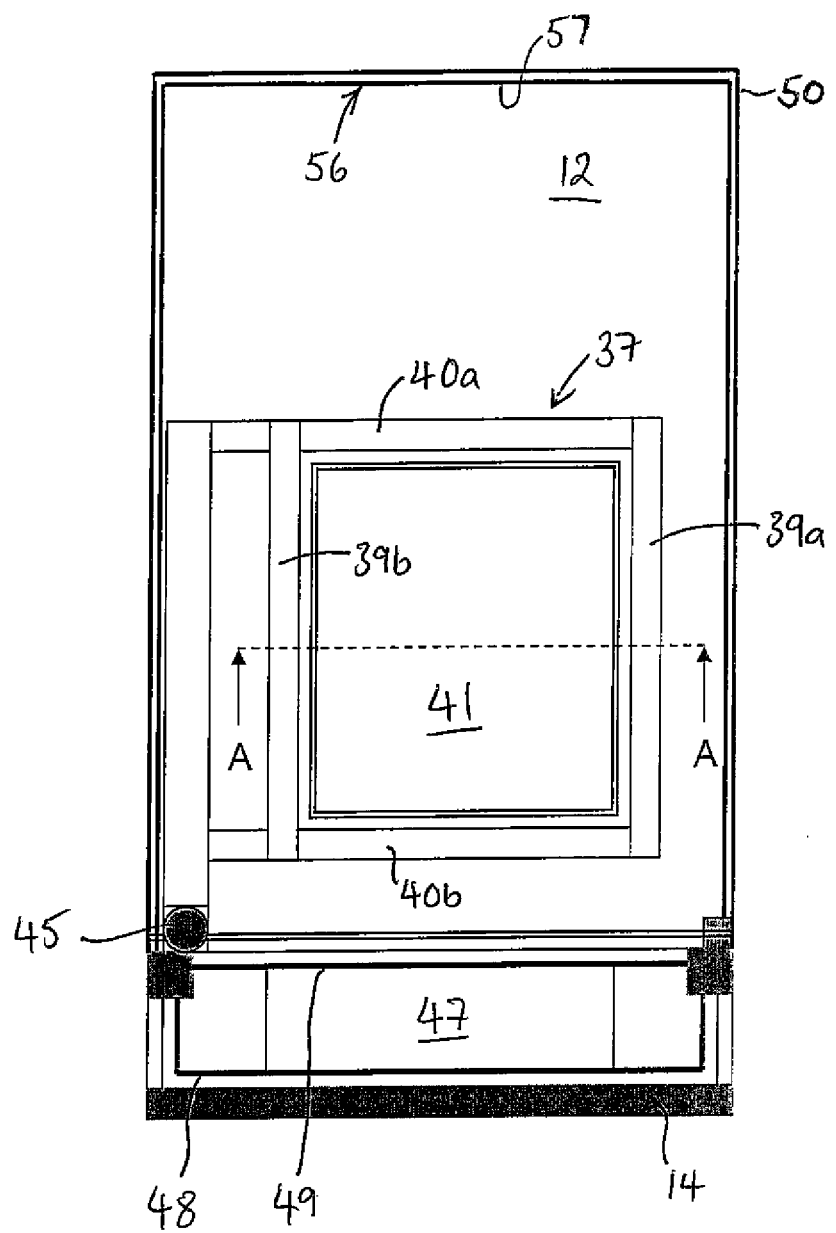
FIG. 2 is a plan view of the trolley of FIG. 1.

The trolley 10 according to the first or second embodiment further comprises a support frame 37, as illustrated in FIG. 2 of the drawings, which is supported from an upper region of one of the upright frame members 11a by a support arm 38. The support frame 37 is arranged to extend over the receptacle 12 and is reconfigurable between a storage configuration and a support configuration. The support frame 37 comprises a first pair 39a, 39b and second pair 40a, 40b of frame arms, the second pair 40a, 40b of which are telescopic and arranged to extend between opposite ends of the first pair of frame arms 39a, 39b. Accordingly, the separation of the first pair of frame arms 39a, 39b can be adjusted by pushing or pulling on one of the first frame arms 39a, 39b, as required, to adjust the length of the second pair of frame arms 40a, 40b.

Figure 3:
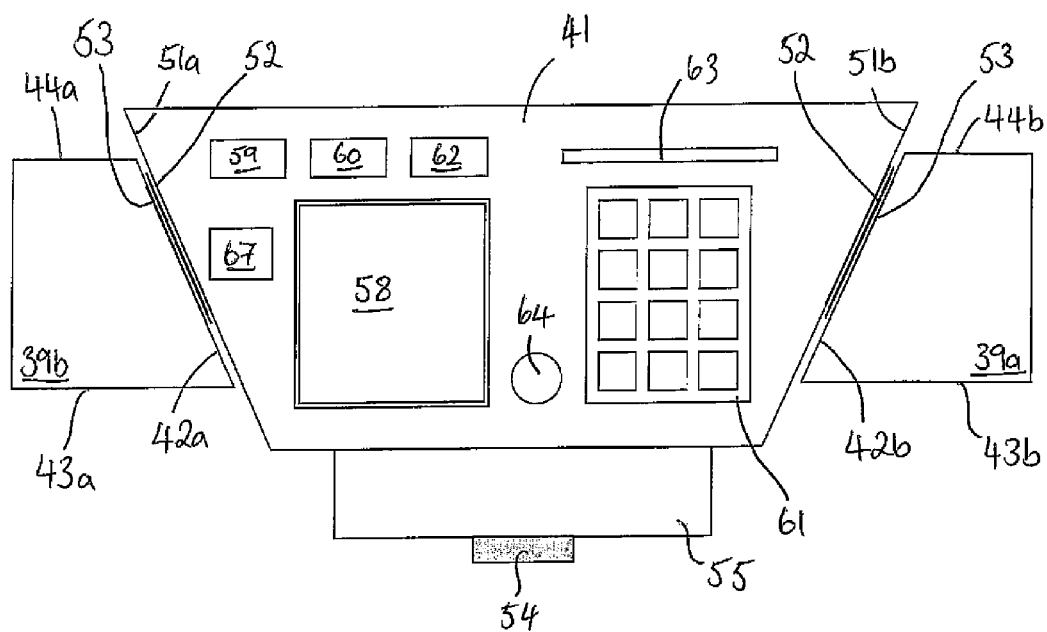
FIG. 3 is a sectional view of the scanning arrangement and support arrangement taken along line A-A of FIG. 2; and, FIG. 4 is a schematic illustration of a data storage device according to an embodiment of the present invention.

The support frame 37 is arranged to receive a scanning arrangement 41 when arranged in the support configuration, namely when the second pair of frame arms 40a, 40b are fully extended. The side faces 42a, 42b of the first pair of frame arms 39a, 39b respectively, which face each other are arranged at an angle to each other and diverge from a lower face 43a, 43b of each frame arm 39a, 39b to an upper face 44a, 44b, so as to provide a cradle for holding the scanning arrangement 41, as illustrated in FIG. 3 of the drawings.

The support arm 38 is coupled to one of the upright frame members 11a by a pivot joint 45 which enables the arm 38 to pivot between a first configuration in which it extends substantially parallel with the handle 14 and a second configuration in which it extends substantially collinear with the upright member 11a to which it is coupled. The pivot joint 45 thus enables the support arm 38 and thus the support frame 37 to be stored neatly between the frame members 11a when the trolley 10 is not in use to conserve space.

To further facilitate the storage of the trolleys 10, a rear section 12b of the receptacle 12 which extends substantially adjacent the upright frame members 11a is pivotally mounted at an upper region of the receptacle 12 about a pivot rod 12c which extends between side sections 12d of the receptacle, so that the rear section 12b can pivot into the receptacle 12. The trolley 10 further comprises a catch arrangement 46 which is arranged to releasably hold the receptacle 12 in a configuration in which the receptacle 12 is pivoted toward the upright frame members 11a, so as to lift the base 12a of the receptacle 12 away from the base members 11b. This increases the clearance of the base 12b of the receptacle 12 from the base members 11b so that the receptacle 12 can pass within a receptacle 12 of an adjacent trolley (not shown) through the rear section 12b for storage.

The trolley 10 further comprises a seat 47 for an infant (not shown). The seat 47 comprises a frame 48 which is pivotally mounted to a cross-member 49 which extends between an upper region of the upright frame members 11a. Alternatively, the frame 48 may be hingedly coupled to one of the upright frame members 11a and lockable in a storage configuration in which the frame extends adjacent a side 12d of the receptacle 12 and an operative configuration in which the seat frame 48 extends between the upright frame members 11a.

The trolley 10 further comprises a barrier 50 which extends around the upper periphery of the receptacle 12 in spaced relation thereto. The barrier 50 acts to prevent a shopper (not shown) from leaning directly upon the receptacle 12, or a shoppers coat (not shown) for example, resting upon the receptacle 12, which would otherwise affect the weight of the receptacle 12 as measured by the load cells or cell 20.

The scanning arrangement 41 is substantially trapezoidal in cross-section, as illustrated in FIG. 3 of the drawings, with the sloping side faces 51a, 51b being arranged at complimentary angle to the to the side faces 42a, 42b of the first pair of frame arms 39a, 39b so that the scanning arrangement 41 cannot fall through the support frame 37. The sloping side faces 51a, 51b of the scanning arrangement 41 comprise electrical connections 52 which are arranged to engage with electrical connections 53 disposed on the sloping side faces 42a, 42b of the first pair of frame arms 39a, 39b, when the scanning arrangement 41 is supported in the support frame 37. The electrical connections 53 on the support frame 37 are arranged in communication with the load cells or cell 20 of the first and second embodiment respectively, by electrical wires (not shown) or similar which extend within the frame 11 so that the scanning arrangement 41 can communicate with the load cells 20. It is also envisaged however, that the load cells 20 may also communicate with the scanning arrangement 41 via a wireless arrangement (not shown).

The scanning arrangement 41 comprises a first and second window 54, 55 from which a first and second scanning beam (not shown) is transmitted, respectively. The scanning beams comprise infra-red beams and the first scanning beam is arranged to scan a barcode (not shown) on the item (not shown) to be placed within the receptacle 12. The second scanning beam is directed upon a reflecting arrangement 56 disposed around the open upper periphery of the receptacle 12 below the barrier 50, and is arranged to detect and monitor for the presence of a shoppers' arm (not shown) upon scanning an item in the first scanning beam. The reflecting arrangement 56 comprises a frame having a retro-reflector (not shown) disposed thereon for reflecting the second beam back toward the second window 55 so that the reflected beam can become detected upon a detector (not shown) disposed within the scanning arrangement 41. The frame 57 may be permanently configured around the open periphery of the receptacle 12 or configured to retractably extend from a storage configuration, in which the frame 57 is disposed proximate to the upright frame members 11a and an operative configuration, in which the frame 57 extends around the open periphery of the receptacle 12. The first scanning window 36 is disposed below the second scanning window 37 substantially at the centre thereof, so that the item (not shown) to be scanned must first pass within the second scanning beam to be scanned by the first scanning beam.

The scanning arrangement 41 further comprises a processor (not shown) for processing the scanned item and recording details of the scanned item, such as price, the name of the item, weight etc, in a memory store (not shown), and a display panel 58 for displaying details of the items scanned, such as price, and user instructions on how to operate the scanning arrangement 41. Furthermore, as items (not shown) are placed within the receptacle 12, the load cells 20 are arranged to generate a signal, representative of the weight of the item, and this signal is subsequently communicated to the scanning arrangement 41 via the communications link (not shown). The scanning arrangement 41 subsequently determines the weight of each item and records this weight in the memory store (not shown).

In addition, the scanning arrangement 41 comprises a "scan" mode which is selectable using button 59 for example, which enables a shopper (not shown) to remove the arrangement and scan the barcode (not shown) of a heavy item (not shown) which is placed within the receptacle 12, but which is too heavy to lift up to the first window 54 of the scanning arrangement 41 when mounted upon the support frame 37. The scanning arrangement 41 further comprises a "consumable" mode which is selectable using button 60 for example, which enables a shopper (not shown) to toggle through various codes, as displayed on the display panel 58, which provide the cost per unit weight of various fruit and vegetables, for example. Alternatively, the particular code may be typed directly using a keypad 61, once the "consumable" mode has been selected. When a shopper (not shown) selects the code for banana's for example, the processor (not shown) within the scanning arrangement will be able to determine the cost of the banana's, since the banana code will provide the cost per unit weight and the weight of the banana's will be directly determinable from the signal from the load cell 20.

The scanning arrangement 41 further comprises a "scan-out" mode which is selectable using button 62 for example. If a shopper scans an item and places the item (not shown) within the receptacle 12, but subsequently decides that the item (not shown) is not actually required, then the shopper (not shown) selects the "scan-out" mode and scans the item (not shown) being removed from the receptacle 12 before returning the item (not shown) to the shelf (not shown).

It is envisaged that after selecting and utilising the "scan", "consumable" or "scan-out" modes, the scanning arrangement 41 will revert back to a normal operational mode in which the scanning arrangement 41 is placed within the support frame 37 so that items can be scanned and placed within the receptacle 12 in the normal manner.

The scanning arrangement 41 further comprises a payment system for debiting the costs of the goods to be bought by the shopper, from a debit or credit card, for example. In this respect, the payment system comprises a card reader 63 for reading and debiting credit and debit cards and the credit and debit card PIN numbers can be entered using the keypad 61. It is also envisaged that the card reader 63 may be used for reading and recording data to customer loyalty cards (not shown), for example. The scanning arrangement 41 may further comprise a port 64 for receiving a connector 65 of a data storage device 66, which may be used to record a receipt of all the transactions.

In use, the shopper (not shown) selects a trolley 10 from a supermarket trolley store (not shown), releases the catch arrangement 46 to level the receptacle 12 and reconfigures the seat frame 48 if required to an operative configuration. The support arm 38 is then reconfigured to the first configuration and the support frame 37 is reconfigured from the storage configuration to the support configuration by separating the first pair of frame arms 395a, 39b so as to cause the second pair of frame arms 40a, 40b to become extended. The shopper (not shown) then pushes the trolley 10 into the supermarket, for example and selects a scanning arrangement 41 from one of a plurality of scanning arrangements 41 mounted on a docking station (not shown). The docking station (not shown) serves to recharge a battery supply (not shown) within the scanning arrangement 41, through the electrical connections 52 disposed upon the scanning arrangement 41, for example, and to further provide a convenient storage for the scanning arrangements 41. The docking station (not shown) comprises a series of coloured light emitting diodes (LED) (not shown), for example a red, green and yellow LED, associated with each scanning arrangement 41. In this case, the red LED is arranged to indicate that the battery (not shown) is being recharged and as such comprises insufficient charge for a shopping trip within a store, a green LED is arranged to indicate that the battery (not shown) comprises sufficient charge and a yellow LED is arranged to indicate that the scanning arrangement 41 is receiving a software update or is defective, for example.

Upon selecting a scanning arrangement 41, the shopper (not shown) then places the arrangement 41 within the support frame 37 so that the electrical connections 52 on the scanning arrangement 41 engage with the electrical connections 53 on the support frame 37. The shopper (not shown) then pushes a calibration button 67 to null the weight reading as determined by the load cells 20, inserts their data storage device 66 if required, and pulls out a series of bags 33, again if required, which are disposed upon the roller supports 36 mounted upon the first pair of rails 34. The shopper (not shown) then pushes the trolley 10 around the supermarket in the conventional manner and selects items (not shown) to be purchased. Each item selected is scanned using the first beam by passing the barcode (not shown) on the item (not shown) in front of the first window 54. Upon scanning the barcode of the item (not shown), the second beam detects the presence of the shoppers' arm (not shown) and the processor (not shown) determines when the shoppers' arm vacates the region scanned by the second beam. If the shoppers' arm vacates the region before the load cells 20 detect an increase in the weight of the receptacle 12, namely before the item is placed within the receptacle 12, or if the region is broken or otherwise entered at a further isolated position, then the scanning arrangement 41 will prevent any further items being scanned until the original item is re-scanned. The processor (not shown) requires the second scanning beam to be broken only once for each item to be placed within the receptacle 12; however, the position of the break is permitted to move within the second scanning beam provided the break is continuous.

The processor (not shown) further determines the time between scanning the item and the reception of a signal from the load cells 20. If the time between scanning the item and the reception of the signal is above a threshold time interval then the processor (not shown) causes the display 58 to display a message requesting that the shopper re-scans the item. In addition, if the weight of the scanned item, as provided by the barcode, does not correspond to the monitored weight increase determined by the weighing means, the scanning arrangement 41 will request that the shopper re-scans the item before allowing the shopper to proceed.

The scanning arrangement 41 is arranged to display a running total of the cost of items within the receptacle 12 on the display 58 so that the shopper can monitor their total expenditure. When all the items have been selected, the shopper takes the trolley 10 to a point of sale terminal and passes the scanning arrangement 41 to a cashier (not shown) who subsequently couples the scanning arrangement 41 to the terminal (not shown) so that all the items recorded on the memory (not shown) can be downloaded to a central repository (not shown), for example. The shopper then pays the cashier without having to remove the items from the trolley 10. It is found that this significantly reduces the checkout time and provides for a less stressful shopping experience. Alternatively, the shopper can pay for the goods using the payment system on the scanning arrangement 41, at a self service station (not shown). In this case, the shopper similarly removes the scanning arrangement 41 to a point-of sale terminal (not shown) so that the information can be downloaded to the central repository (not shown). It is envisaged that the self service station may comprise a camera (not shown) for relaying visual data of the shopper to a supervisors screen (not shown), so that if the scanning arrangement 41 indicates that alcohol is being bought, for example, then the supervisor can determine whether the shopper should be consulted to verify their age. It is also envisaged that the self service station (not shown) may further comprise means for indicating to the supervisor that there is an inconsistency with the items scanned and those placed within the receptacle 12 of the trolley 10.

Figure 4:
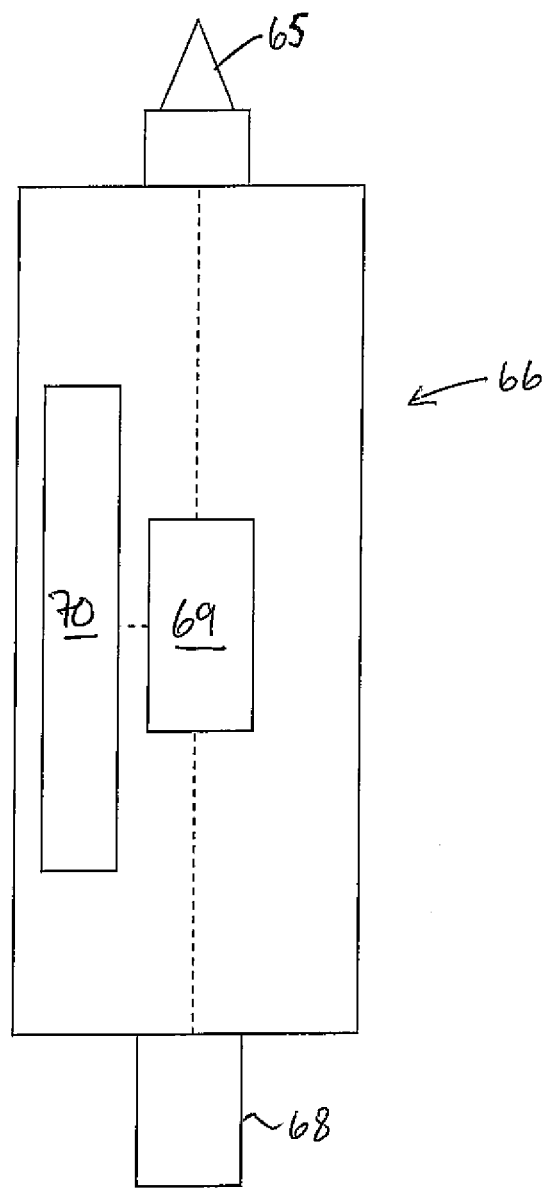

Whether the shopper uses a manned point-of-sale (not shown) or self service station (not shown), the shoppers receipt (not shown) is downloaded to a data storage device 66 and retained by the shopper for future reference. Referring to FIG. 4 of the drawings, there is illustrated a storage device 66 according to an embodiment of the present invention. It is envisaged that the storage device 66 will comprise a USB type connector 68 at one end and a further connector, such as a Firewire connector 65 disposed at the opposite end thereof, as illustrated in FIG. 4 of the drawings. The storage device 66 comprises a controller 69 disposed therein which controls access for writing data to the memory 70, and a unique serial number. It is envisaged that the USB connector 68 will enable a shopper to view and delete receipts from the storage device 66 using their personal computer (not shown), however, in order to write data to the memory 70, it is first necessary to plug Firewire connector 65 of the storage device 66 into a Firewire socket (not shown) disposed within a scanning arrangement 41 or point-of-sale terminal (not shown) associated with the store. The controller 69 is then sent a secure access code before it will allow data to be written to the memory 70, namely before a receipt can be downloaded to the storage device 66, for example. The access code will be derived from the internal unique serial number using various algorithms, such as a challenge-response algorithm. In this way, the authorised scanning arrangement 41 or point-of-sale terminal (not shown) can create files, which may be accessed and viewed and if necessary deleted by shoppers using their personal computer (not shown). It is also envisaged that the USB connector 68 may be detachably coupled to the device 66, such that the device 66 comprising only the Firewire connector 65 is taken when shopping, for example. The USB connector 68 is unique to the device 66, so that in the event that the device 66 comprising the Firewire connector 65 only is lost or stolen when shopping, for example, no information can be obtained from the device 66, by a third party since this would require the unique USB connector 68.

The memory 70 of the device 66 comprises a plurality of memory files which are selectable using a sleeve (not shown) which extends around the device 66. The sleeve (not shown) is arranged to rotate to select the desired file, such as a file comprising details of the user's bank account to enable the user to pay for their goods, a file comprising details of the user's loyalty scheme with the store, a file comprising a list of the user's previous receipts etc. Upon rotating the sleeve to select the required file, a corresponding wireless receiver unit, such as an interrogable tag (not shown) becomes presentable to the user via a window (not shown) on the device 66. The tag (not shown) enables data to be written to the corresponding file and/or read from the corresponding file wirelessly, while connected using the Firewire connector 65.

It is envisaged that the device 66 may further comprise an interrogable tag (not shown) which is interrogated by a store system (not shown) as a user (not shown) and thus the device 66 enters the store (not shown). Upon entering the store (not shown), the store system (not shown) is arranged to interrogate the device 66 to extract user information such as user e-mail address, a store loyalty scheme of the user etc and holds the user data in a central repository (not shown) while the user shops, such that when the user presents the device 66 for use in the store (not shown), the user data is readily available to provide for a more efficient checkout service, such as the transmission of an electronic receipt to the users e-mail account, for example.

Once the items have been paid for, the shopper then takes the items to their vehicle (not shown). The scanning arrangement 41 is then returned to the docking station (not shown) for further use by another shopper and to enable the battery supply (not shown) housed within the scanning arrangement 41 to become recharged. The support frame 37 may then be returned to the storage configuration and the support arm 38 pivoted to the second configuration, namely parallel to the handle 14, for subsequent storage in the supermarket trolley store (not shown).

From the foregoing therefore, it is evident that the trolley provides a simple yet more efficient shopping experience and checkout time when shopping.

The invention claimed is:

1. A data storage device for use with a number of host systems including a first-type host system and a second-type host system, comprising:
   a memory means;
   a controller for controlling the transfer of data to and from the memory means;
   a first connector that is configured to interface to a respective first-type host system; and
   a second connector, separate and distinct from the first connector, that is configured to interface to a respective second-type host system,
   wherein the controller is configured to selectively allow data supplied by the respective first-type host system via the first connector to be written to the memory means,
   wherein the controller is configured to allow data stored in the memory means to be accessed by the respective second-type host system via the second connector for presentation of the data on the respective second-type host system,
   wherein in the case that the data is accessed or supplied by the respective first-type host system via the first connector, the controller is configured to permit reading and writing of data stored in the memory means, and
   wherein in the case that the data is accessed by the respective second-type host system via the second connector, the controller is configured to permit only reading and deleting of data stored in the memory means.

2. A storage device according to claim 1, wherein:
   wherein the controller is configured to selectively allow the data supplied by the respective first-type host system via the first connector to be written to the memory means according to an access code matching process that matches an access code supplied by the respective first-type host system via the first connector to corresponding data associated with the storage device.

3. A storage device according to claim 2, wherein:
   the access code is generated when the storage device is connected to the respective first-type host system using the first connector.

4. A storage device according to claim 1, wherein:
   the memory means comprises a plurality of memory files which are individually selectable for reading and writing data thereto and therefrom as required by a sleeve which is arranged to rotate to select a desired file.

5. A storage device according to claim 1, further comprising:
   a window for admitting wireless signals to one of a plurality of receiver units.

6. A storage device according to claim 5, wherein:
   the receiver units are individually presentable to the window using the sleeve.

7. A storage device according to claim 5, wherein:
   the receiver units separately correspond with a memory file.

8. A storage device according to claim 7, wherein:
   the receiver units are arranged to receive wireless signals for reading and writing data to and from the selected memory file.

9. A storage device according to claim 1, wherein:
   the first and second connectors support wired serial connections of different types.

10. A system comprising:
    the storage device of claim 1;
    a retail host computer that is configured as the first-type host system to allow the retail host computer to interface to the first connector of the storage device to store data representing a transaction receipt in the memory means of the storage device; and
    a consumer host computer that is configured as the second-type host system to allow the consumer host computer to interface to the second connector of the storage device to access the data representing the transaction receipt as stored in the memory means of the storage device.

* * * * *